(12) United States Patent
Fahlgren et al.

(10) Patent No.: US 12,294,676 B2
(45) Date of Patent: May 6, 2025

(54) PIPELINE FLOW MANAGEMENT FOR CALLS

(71) Applicant: Twilio Inc., San Francisco, CA (US)

(72) Inventors: Christer Jan Erik Fahlgren, San Francisco, CA (US); Umair Akeel, San Ramon, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/888,944

(22) Filed: Aug. 16, 2022

(65) Prior Publication Data

US 2024/0064239 A1 Feb. 22, 2024

(51) Int. Cl.
| | |
|---|---|
| *H04M 3/00* | (2024.01) |
| *G10L 15/30* | (2013.01) |
| *H04L 67/306* | (2022.01) |
| *H04M 3/42* | (2006.01) |
| *H04M 3/523* | (2006.01) |

(52) U.S. Cl.
CPC ........... *H04M 3/5232* (2013.01); *G10L 15/30* (2013.01); *H04L 67/306* (2013.01); *H04M 3/42221* (2013.01)

(58) Field of Classification Search
CPC . H04M 3/5232; H04M 3/42221; G10L 15/30; H04L 67/306
See application file for complete search history.

(56) References Cited

U.S. PATENT DOCUMENTS

| | | | |
|---|---|---|---|
| 2011/0099006 A1* | 4/2011 | Sundararaman | H04L 12/1831 704/235 |
| 2019/0236204 A1* | 8/2019 | Canim | G10L 15/1815 |
| 2021/0389924 A1* | 12/2021 | Chong | H04W 12/02 |
| 2022/0253788 A1* | 8/2022 | Hingne | G06F 16/2379 |

* cited by examiner

*Primary Examiner* — Rasha S Al Aubaidi
(74) *Attorney, Agent, or Firm* — Schwegman Lundberg & Woessner, P.A.

(57) ABSTRACT

A method and system provide for receiving the first request to generate a pipeline flow, identifying a user account based on the first request, associating the pipeline flow with the user account, receiving a second request to process an action associated with the user account, and processing the action including applying the pipeline flow to select the component configuration based on the parameter.

20 Claims, 8 Drawing Sheets

PIPELINE FLOW MANAGEMENT FOR CALLS

TECHNICAL FIELD

The subject matter disclosed herein generally relates to methods, systems, and machine-readable storage media for managing pipeline flows for API requests, such as API requests related to voice communications and other types of communications.

BACKGROUND

Current communication systems provide services to process voice calls for various purposes, such as for recording, transcribing, and analyzing the content of the voice calls. However, each service needs to be triggered individually to generate outputs that are needed for each customer. Due to the large number of calls being processed on a daily basis, the current communication systems suffer from significant system latency and unnecessary waste of computing resources.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
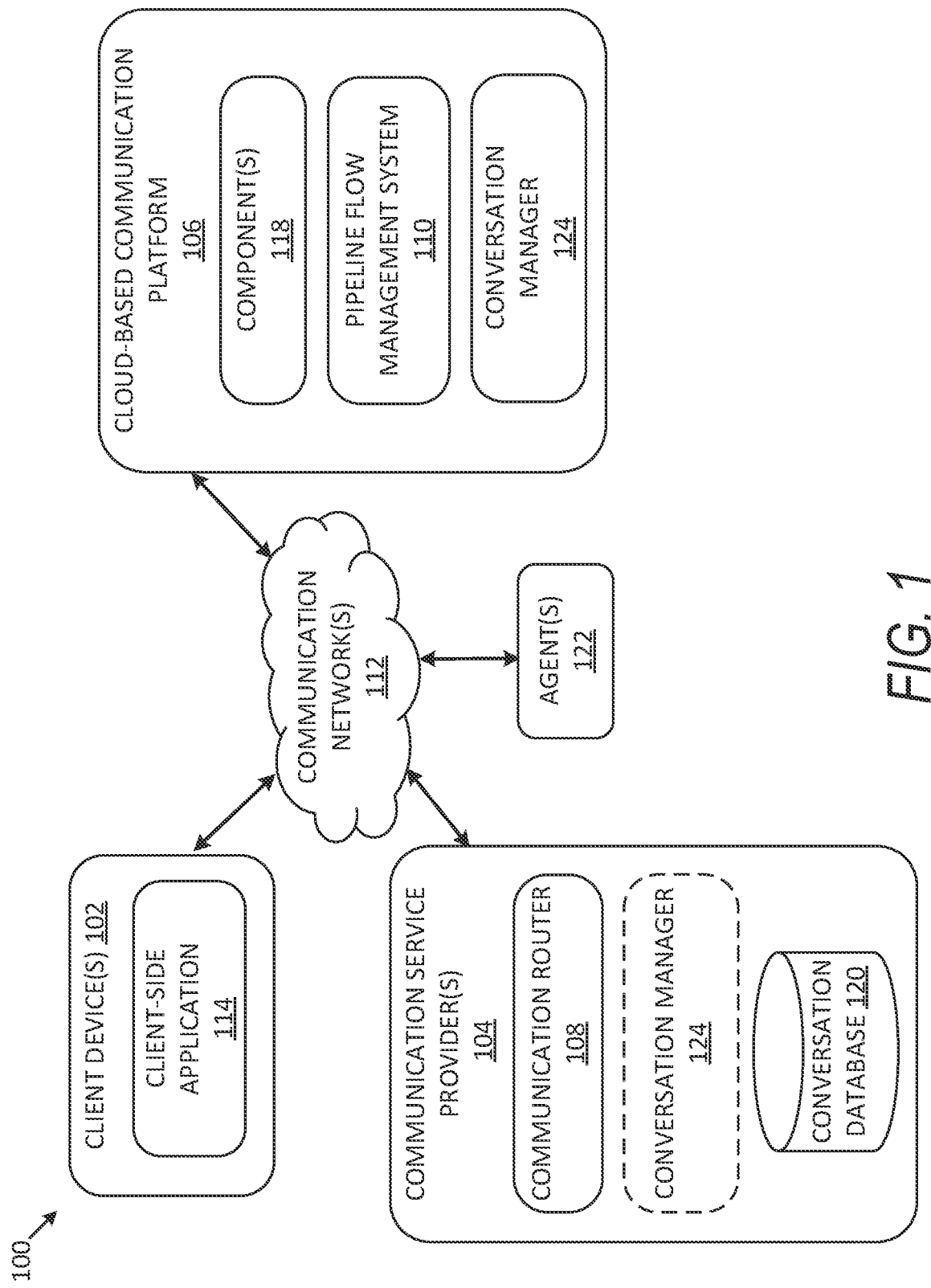
FIG. 1 depicts a block diagram showing an example networked environment in which the disclosed technology may be practiced, according to various example embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Various embodiments include systems, methods, and non-transitory computer-readable media for generating and managing pipeline flow for handling and processing voice and video calls. Specifically, a pipeline flow management system generates and manages pipeline flows to automatically trigger services (also referred to as components as described herein) from various sources in a logical order to generate outputs requested by customers.

In various embodiments, the pipeline flow management system receives a request to generate a pipeline flow. The request includes one or more parameters associated with one or more component configurations included in the pipeline flow. An example pipeline flow may include a recording component configuration, a transcription component configuration, and a language operation component configuration. The component configurations are arranged in one or more logical orders such that one or more outputs of a component feed into the next component as one or more valid inputs. For example, a rule associated with a logical order may provide that a transcription component can be triggered based on the availability of an output of a recording component; and a language operation component can be triggered based on the availability of an output of a transcription component. Therefore, the pipeline flow may include recording the call as the first step, followed by the second step of transcribing the call, and the third step of language operation. Each step corresponds to an action that can be automatically executed by one of the components based on the associated component configuration.

In various embodiments, multiple component configurations could be executed simultaneously. A pipeline flow may support parallel processing of certain component configurations.

In various embodiments, upon receiving the request to generate the pipeline flow, the pipeline flow management system identifies a user account based on the request. For example, the request may include an account identifier associated with a user account. The pipeline flow management system may associate the pipeline flow with the user account to apply the pipeline flow to future calls associated with the user account. In various embodiments, a pipeline flow can be assigned to certain types of accounts.

In various embodiments, the pipeline flow management system receives a request to process an action (e.g., a pipeline instance) associated with the user account. The action may include generating one or more outputs by a selected component based on the pipeline flow. In various embodiments, outputs of a call may include a recording, a transcript, or metadata associated with a communication, such as a voice call. An example of metadata associated with a call may be annotations or tags to a conversation during the processing of a communication (e.g., voice or video call). Another example of metadata associated with a communication may be sensitive information (e.g., social security numbers) mentioned by parties during the communication. The metadata may be generated by one or more machine learning models.

In various embodiments, that the one or more machine-learning (ML) models or algorithms may provide the communications platform with the ability to perform tasks by making inferences based on patterns determined based on the analysis of data. The one or more ML models or algorithms may learn from existing data (e.g., training data) and make predictions for new data. The one or more ML models or algorithms may be built from example training data in order to make data-driven predictions or decisions expressed as outputs or assessments. In various embodiments, one or ML models for language operation may be built based on past conversations or communications and their respective summaries, including tags or annotations indicating one or more outcomes associated with those past conversations or communications.

In various embodiments, an example input of a language operation ML model may be a recording or a transcript of a communication (e.g., a voice or video call), and an example output may be a summary including tags or annotations indicating conversation states and the information associated with the conversation states. A conversation state refers to a segment of the conversation associated with a single topic (e.g., providing the name of the party, obtaining contact information, etc.). Each state is associated with a corresponding label (e.g., tag). The information associated with a conversation state may be sensitive information, such as the name of a party, social security number, or driver's license number given to an agent, etc.

In various embodiments, the ML model may output one or more predicted outcomes of the communication or conversation, such as a percentage chance that the conversation may lead to an escalation to a supervisor within a call center environment or a percentage chance that the conversation will be resolved without such an escalation. In example embodiments, the ML model may output one or more tags that are predicted to be associated with parts of communication or conversation, such as one or more words or phrases included in the communication or conversation. For example, the ML model may provide output in the form of tags, such as tags indicating that a part of the communication or conversation is a name identifying an individual or an organization, an action that a party of the conversation is interested in performing, includes sensitive information, and so on.

In various embodiments, a user account may be associated with a default pipeline flow. A default pipeline flow may include any number of component configurations, such as a recording component configuration, a transcription configuration, language operation configuration, and recording modification component configuration. Each component configuration is associated with a corresponding component that performs the associated operations. For example, a recording component performs recording operations based on the recording component configuration defined by one or more parameters. In various embodiments, the pipeline flow management system may select a set of default parameters for default component configurations for users. A user may customize the pipeline flow by adding or removing component configurations from the pipeline flow and/or updating the parameters for each component configuration to cause the associated component to generate outputs as needed.

In various embodiments, the pipeline flow management system receives the request to process an action associated with the user account. The request may be a user-generated request or a system-generated request. A system-generated request may be triggered in response to detecting a communication, such as a voice call, associated with the user account is established. In such a scenario, a first pipeline instance (e.g., the action, such as recording the communication), determined by the logical order described herein, is automatically triggered, and processed in response to receiving the system-generated request.

In various embodiments, the pipeline flow management system processes the action, including applying the pipeline flow, to select one or more component configurations based on one or more parameters. In various embodiments, upon selecting the component configuration, the pipeline flow management system causes one or more components associated with the one or more component configurations to generate one or more outputs associated with a communication, such as a call. A call may be a voice call or a video call.

In various embodiments, the pipeline flow management system applies the pipeline flow to automatically process a next action associated with the user account. The next action may be a pipeline instance executed by a component based on the associated component configurations. A component configuration may be determined based on either the default settings of the pipeline flow or a customized pipeline flow configured for a user. For example, suppose a pipeline flow includes a transcription configuration and a language operation configuration. Upon transcribing the call based on the transcription configuration, the language operation component may be automatically triggered upon detecting an availability of the transcription outputs (e.g., a transcript of the call), which are then provided as inputs into the language operation component In various embodiments, actions may be triggered via an Application Programming Interface (API) provided by a component associated with the component configuration. In various embodiments, a component (e.g., component 118) configuration may correspond to a component that is an internal component of the cloud-based communication platform 106 as illustrated in FIG. 1, or an external component communicatively coupled to the cloud-based communication platform 106.

In various embodiments, upon identifying the user account based on the request, the pipeline flow management system may determine the pipeline flow has already been associated with the user account. Based on the determination, the pipeline flow management system may update the pipeline flow to incorporate the one or more parameters.

In various embodiments, the pipeline flow management system may receive a further parameter associated with a component configuration during the processing of a communication (e.g., voice or video call). The pipeline flow management system may dynamically adjust the pipeline flow to incorporate the further parameter into the component configuration during the processing of a communication (e.g., voice or video call).

Because the order in which each component configuration supported by the communication platform is executed may be controlled (e.g., by modifying the pipeline flows and/or by specifying one or more parameters of an API of a configuration service), the component configurations themselves and/or their underlying services do not have to be redesigned or otherwise modified and/or redeployed when different service usage patterns arise or are specified (e.g., by an operator or an administrator of the communication platform), thereby computing resources are conserved.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 depicts a block diagram showing an example networked environment 100 in which the disclosed technology may be practiced, according to various example embodiments. As shown in FIG. 1, the example networked environment 100 includes one or more computing devices (e.g., client devices 102), communication service provider 104, cloud-based communication platform 106, and one or more agents 122, communicatively coupled to a communication network 112 and configured to communicate with each other through the use of the communication network 112. The cloud-based communication platform 106 includes one or more components 118, a pipeline flow management system, and a conversation manager 124. In various embodiments, the one or more components may be one or more services. Each service (or component) may be individually triggered (e.g., via an API call) to generate outputs. The API call may include a parameter to specify a pipeline configuration. If no pipeline configuration is specified, a default pipeline configuration may be used or a pipeline configuration may be determined (e.g., in real-time) as described herein. A service may be an internal service residing within the cloud-based communication platform 106, or an external service communicatively coupled to the cloud-based communication platform 106 via the communication network 112. The pipeline flow management system 110 generates and manages pipeline flows to automatically trigger components arranged in a logical order and to generate corresponding outputs (e.g., in response to actions initiated by customers or other users of the communication platform).

The networked environment 100 as illustrated in FIG. 1 is only for ease of explanation and is not meant to be limiting. One skilled in the art would appreciate that the networked environment 100 can include any number of client devices 102, agents 122, and communication service provider 104. Further, each communication service provider 104 may concurrently interact with any number of client devices 102 and agents 122, and support connections from a variety of different types of client devices 102, such as desktop computers, mobile computers, mobile communications devices, e.g., mobile phones, smartphones, tablets, smart televisions, set-top boxes, and any other network-enabled computing devices. Hence, the client devices 102 may be of varying types, capabilities, operating systems, and so forth.

In various embodiments, a communications service provider 104 provides call center services to facilitate voice and data communications between users of client devices 102 and agents 122. In various embodiments, the communication service provider 104 may be a service (or a component 118) residing within the cloud-based communication platform 106. Agents 122 may work for a plurality of companies that use the services of the communications service provider 104. The users of client devices 102 may request to establish communications, such as audio calls, video calls Short Message Service (SMS) messages, and messenger messages (e.g., Whatsapp Messenger messages, or Facebook Messenger messages, etc.), to communicate with the agents 122, such as for requesting support for a product or service. The users of client devices 102 and agents 122 communicate with the communications service provider 104 via direct connections or a communication network 112, such as the Internet or a private network connection.

In various embodiments, the communication service provider 104 may be external to the cloud-based communication platform 106. In such a scenario, the conversation manager 124 and conversation database 120 may reside within the cloud-based communication platform 106.

In various embodiments, when a user of a client device 102 requests a communication, such as a video or voice (e.g., audio), SMS messages, or messenger messages (e.g., Whatsapp or Facebook messenger messages) communication, with a company, the associated communications service provider of the communications service provider(s) 104, via a communication router 108, routes the video or voice communications to an agent 122 from that company. In various embodiments, when an agent 122 initiates the call, a conversation manager 124, residing in the cloud-based communication platform 106, routes the call to the user of the client device 102. During a conversation, the conversation manager 124 records the conversations in a conversations database 120 of the communications service provider 104.

Additionally, the communications service provider 104 includes a video processor (not shown) that processes video calls, a voice processor (not shown) that processes voice calls (e.g., audio calls).

The conversation manager 124 manages the conversations, such as establishing, monitoring, and terminating conversations and managing the storage of conversation data when requested by a user of a client device 102. The user (or customer) may use the conversation data to manage, monitor, and improve operations, such as to monitor for compliance by an agent or to determine when a follow-up call is requested to further a sales process.

The communication network 112 is any type of network, including a local area network (LAN), such as an intranet, a wide area network (WAN), such as the Internet, a telephone, and a mobile device network, such as a cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Client devices 102 can be connected to the communication network 112. A client device is any type of general computing device capable of network communication with other computing devices. For example, a client device can be a personal computing device such as a desktop or workstation, a business server, or a portable computing device, such as a laptop, smartphone, or a tablet personal computer. A client device can include some or all of the features, components, and peripherals of the machine 700 shown in FIG. 7.

To facilitate communication with other computing devices, a client device 102 includes a communication interface configured to receive a communication, such as a request, data, and the like, from another computing device in network communication with the computing device and pass the communication along to an appropriate module running on the client device. The communication interface also sends a communication to another client device in network communication with the client device.

A user interacts with the communication service provider 104 via a client-side application 114 installed on the client device 102. In some embodiments, the client-side application 114 includes a component specific to the communication service provider 104. For example, the component may be a stand-alone application, one or more application plug-ins, and/or a browser extension. However, the users may also interact with the communication service provider 104 via a third-party application, such as a web browser or messaging application, that resides on the client devices 102 and is configured to communicate with the communication service provider 104. In either case, the client-side application presents a user interface (UI) for the user to interact with the communication service provider 104. For example, the user interacts with the communication service provider 104 via a client-side application integrated with the file system or via a webpage displayed using a web browser application.

A user may also interact with communication platform 106 via the client-side application 114 installed on the client devices 102. In some embodiments, the client-side application includes a component specific to the communication platform 106. For example, the component may be a stand-alone application, one or more application plug-ins, and/or a browser extension. In various embodiments, the user may also interact with the communication platform 106 via a console interface provided by the communication platform 106, such as a web browser or messaging application configured to communicate with the communication platform 106. In either case, the client-side application presents a user interface for the user to interact with the communication platform 106.

In various embodiments, a user may interact with the pipeline flow management system 110 via the user interface provided by the cloud-based communication platform 106. In various embodiments, a user (or a customer) may interact with the pipeline flow management system 110 via an API interface or a console interface provided by the communication platform 106.

Figure 2:
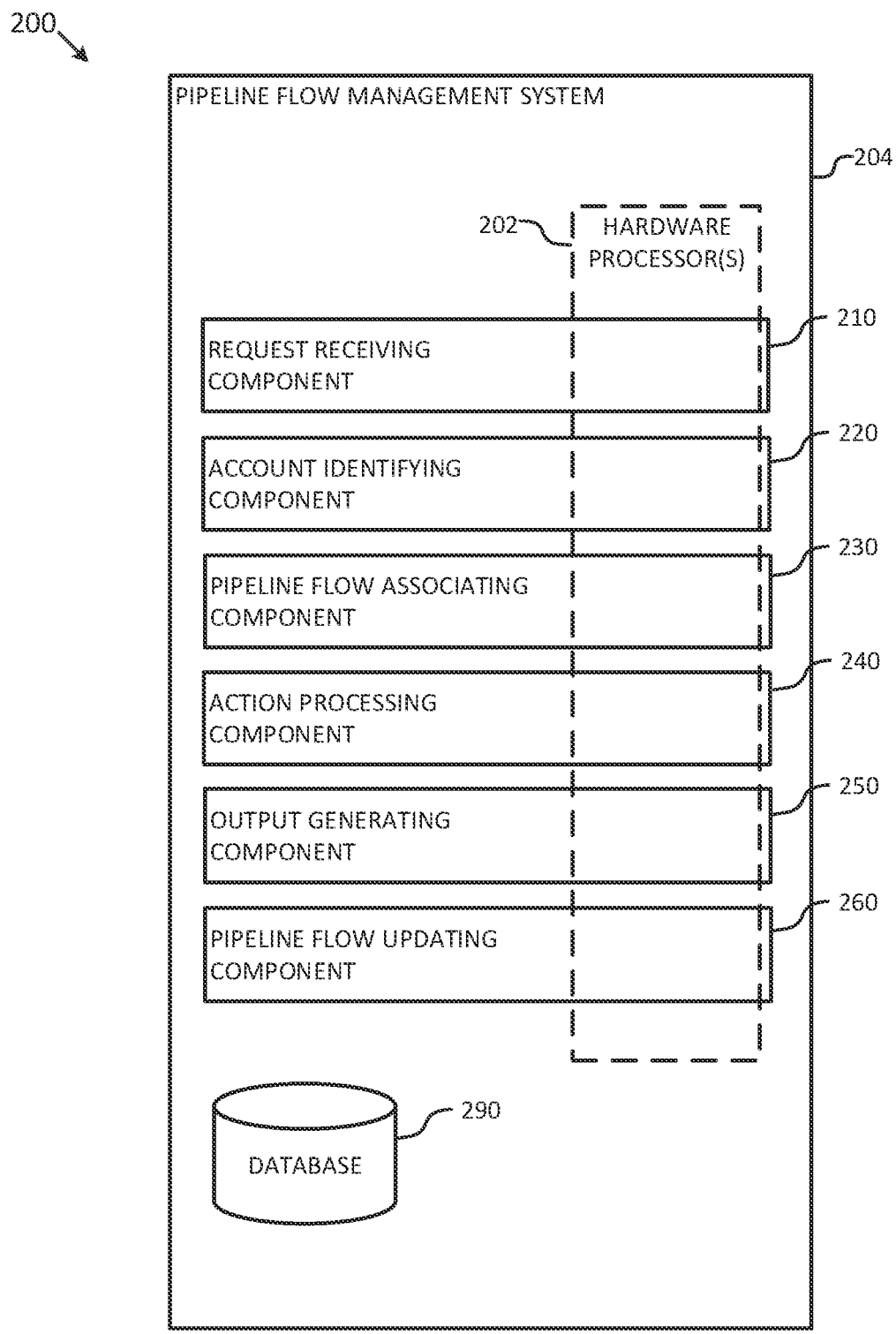
FIG. 2 depicts a block diagram illustrating an example pipeline flow management system, according to various example embodiments.

FIG. 2 depicts a block diagram 200 illustrating an example pipeline flow management system, according to various example embodiments. For some embodiments, the pipeline flow management system 204 represents an example of the pipeline flow management system 110 described with respect to FIG. 1. As shown, the pipeline flow management system 204 comprises a request receiving component 210, an account identifying component 220, a pipeline flow associating component 230, an action processing component 240, an output generating component 250, a pipeline flow updating component 260, and a database 290.

Figure 5A:
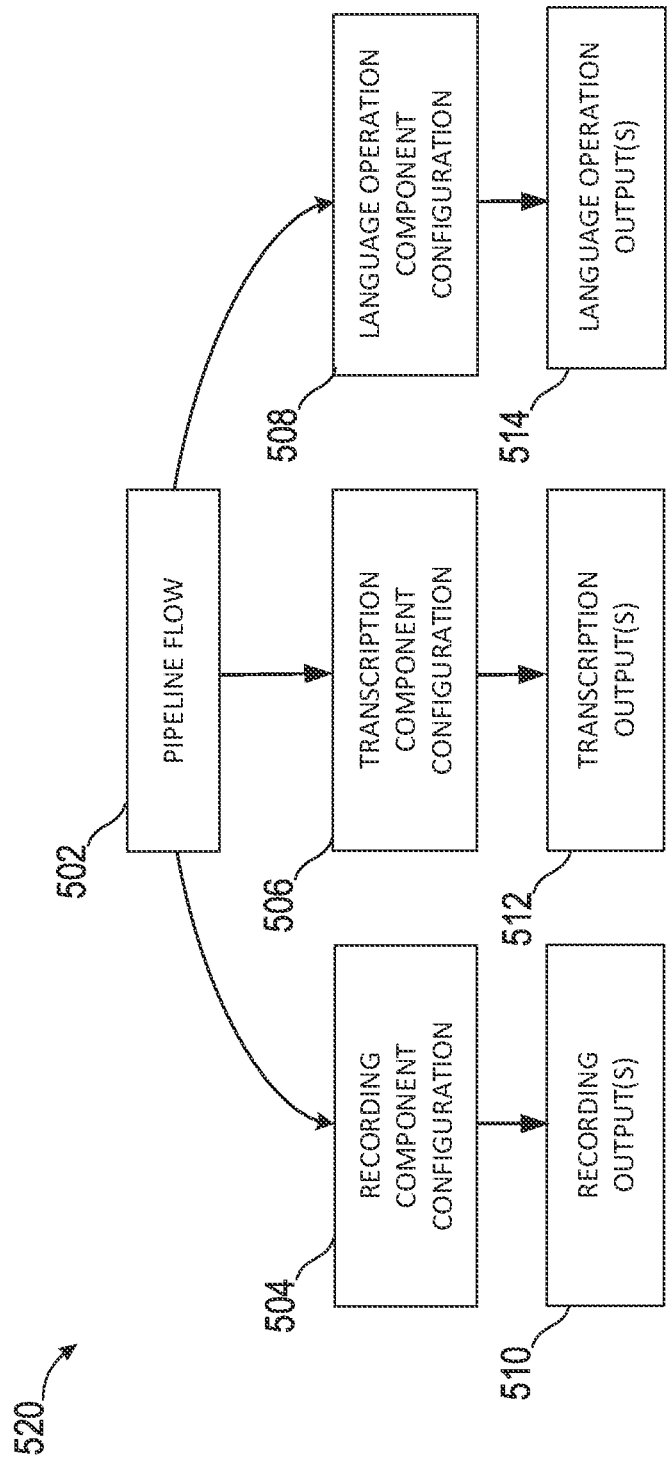
FIG. 5A depicts a block diagram illustrating an example pipeline flow, according to various example embodiments.

The request receiving component 210 is configured to receive a request to generate a pipeline flow. The request may include one or more parameters associated with one or more component configurations included in the pipeline flow. An example pipeline flow may include recording component configuration, transcription component configuration, and language operation component configuration, as illustrated in FIG. 5A. In various embodiments, a request may be received via a gateway, such as a console interface or an API interface provided by the cloud-based communication platform 106.

The account identifying component 220 is configured to identify a user account based on the request. A user account may be associated with one or more pipeline flows. A request may include an account identifier associated with a user account. The account identifying component 220 may associate the pipeline flow with the user account to apply the pipeline flow to future calls associated with the user account.

The pipeline flow associating component 230 is configured to associate a pipeline flow with a user account so that the pipeline flow may be applied to future actions taken by the user with respect to the communication platform, such as an invocation of a service through an API of a component configuration.

In various embodiments, an action may include generating one or more outputs by a selected component based on the pipeline flow. In various embodiments, outputs of a component may include a recording, a transcript, and metadata associated with the communication.

In various embodiments, a request may be a user-generated request or a system-generated request. A system-generated request may be triggered in response to detecting a communication associated with the user account is established. In such a scenario, a first pipeline instance (e.g., the action, such as recording the communication via the recording component) is automatically triggered and processed in response to receiving the system-generated request.

The action processing component 240 is configured to receive a request to process an action (e.g., a pipeline instance) based on the associated component configuration. Each component configuration may be associated with one or more parameters, either defined by a user or by the system as default parameters. In example embodiments, one or more of the parameters may specify a pipeline flow to associate with the action.

In various embodiments, the action processing component 240 is configured to apply the pipeline flow to process a next action associated with the user account. The next action may be determined based on a pipeline instance executed by a component based on the associated component configurations. A component configuration may be determined based on either the default settings of the pipeline flow or a customized pipeline flow configured for a user. For example, suppose a pipeline flow includes a transcription configuration and a language operation configuration. Based on the order specified in the pipeline flow, upon transcribing the call based on the transcription configuration, the language operation component may be automatically triggered based on the language operation configuration.

The output generating component 250 is configured to cause one or more components (e.g., components 118) to generate one or more outputs of a call.

The pipeline flow updating component 260 is configured to update a pipeline flow to incorporate received parameters associated with component configurations included in the pipeline flow. In various embodiments, the pipeline flow updating component 260 may be configured to dynamically update a pipeline flow based on received parameters during a communication.

Figure 3:
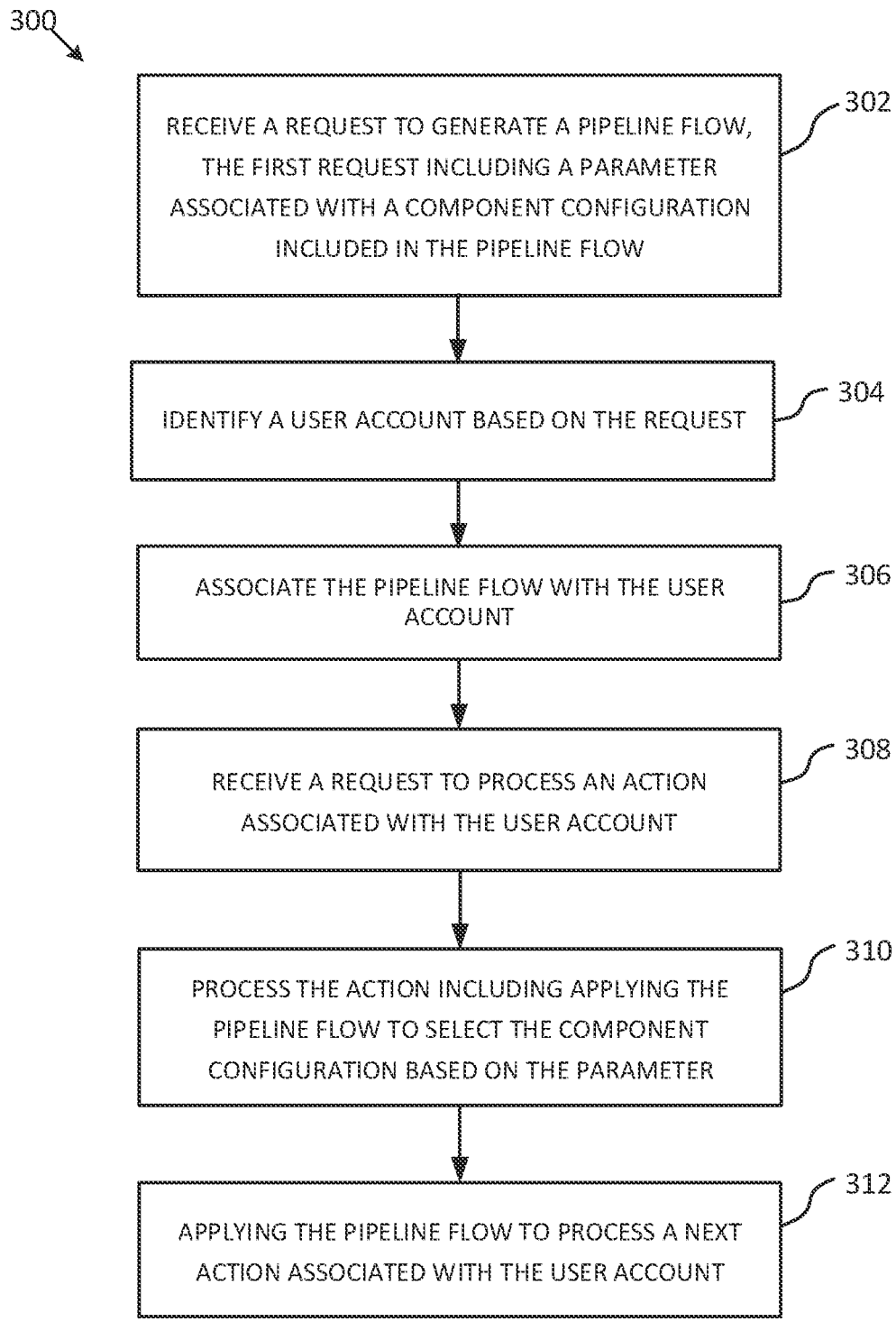
FIG. 3 depicts a flowchart illustrating an example method for managing pipeline flows during operation, according to various example embodiments.

FIG. 3 depicts a flowchart illustrating an example method 300 for managing pipeline flows during operation, according to various example embodiments. It will be understood that example methods described herein may be performed by a machine in accordance with some embodiments. For example, method 300 can be performed by the pipeline flow management system 110 described with respect to FIG. 1 and FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, the processor receives a request (e.g., the first request) to generate a pipeline flow. The request includes one or more parameters associated with one or more component configurations included in the pipeline flow. An example pipeline flow may include recording component configuration, transcription component configuration, and language operation component configuration. The component configurations are arranged in one or more logical order such that one or more outputs of a component feed into the next component as one or more valid inputs. For example, a rule associated with a logical order may provide that a transcription component can be triggered based on the availability of an output of a recording component; and a language operation component can be triggered based on the availability of an output of a transcription component. Therefore, the pipeline flow may include recording the call as the first step, followed by the second step of transcribing the call, and the third step of language operation. Each step corresponds to an action that can be automatically executed by one of the components based on the associated component configurations.

At operation 304, the processor identifies a user account or a type of a user account based on the request. For example, the request may include an account identifier associated with a user account.

At operation 306, the processor associates the pipeline flow with the user account or the type of the user account to apply the pipeline flow to future calls associated with the user account or the type of the user account. In various embodiments, a user account may be associated with a default pipeline flow. A default pipeline flow may include any number of component configurations, including a recording component configuration, a transcription configuration, language operation configuration, and recording modification component configuration, as illustrated in FIG. 5A. Each component configuration is associated with a corresponding component or underlying service that performs the associated operations. For example, a recording component performs recording operations based on the recording component configuration defined by one or more parameters. The pipeline flow management system may select a set of default parameters for default component configurations for users. A user may customize the pipeline flow by adding or removing component configurations from the pipeline flow and/or updating the parameters for each component configuration to cause the associated component to generate outputs as needed.

At operation 308, the processor receives a request (e.g., the second request) to process an action (e.g., a pipeline instance) associated with the user account. The action may include generating one or more outputs by a selected component based on the pipeline flow. In various embodiments, outputs of a call may include a recording, a transcript of a conversation, and metadata associated with the call. An example of metadata associated with a call may be annotations or tags to a conversation during the call. The metadata may be generated by one or more machine learning models. Another example of metadata associated with a call may be data related to sensitive information (e.g., social security numbers) identified based on a recording or a transcript of a call.

At operation 310, the processor processes the action, including applying the pipeline flow to select one or more component configurations (e.g., based on one or more parameters). In various embodiments, upon selecting the component configuration, the pipeline flow management system causes one or more components associated with the one or more component configurations to generate one or more outputs.

At operation 312, the processor processes a next action associated with the user account based on the pipeline flow. The next action may be a pipeline instance determined based on a logical order as described herein. For example, suppose a pipeline flow includes a transcription configuration and a language operation configuration. Upon transcribing (e.g., first action) the call based on the transcription configuration, the language operation (e.g., next action) may be automatically triggered based on the language operation configuration. The language operation may be determined to be the second action based on an example rule specified in the pipeline flow, such as a rule providing that the language operation is to be carried out based on a transcript having been generated by a transcription component.

Though not illustrated, method 300 can include an operation where a graphical user interface for managing pipeline flows can be displayed (or caused to be displayed) by the hardware processor. For instance, the operation can cause a client device (e.g., the client device 102 communicatively coupled to the pipeline flow management system 110) to display the graphical user interface for managing pipeline flows. This operation for displaying the graphical user interface can be separate from operations 302 through 312 or, alternatively, form part of one or more of operations 302 through 312. In example embodiments, the graphical user interface may be caused to be generated and presented (e.g., on client device 102). The graphical user interface may facilitate a selection of parameters corresponding to each available component. A user may choose one or more parameters to define each component configuration to generate or update a pipeline flow. Additionally, the user interface may facilitate specifying a default pipeline flow for or associating a particular pipeline flow with one or more user accounts or types of user accounts.

Figure 4A:
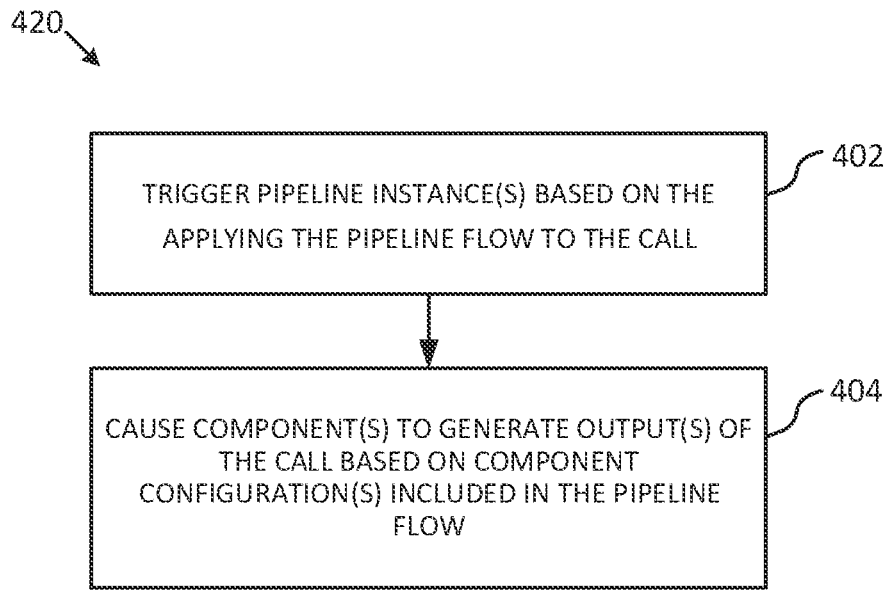
FIGS. 4A and 4B depict flowcharts illustrating example methods for managing pipeline flows during operation, according to various example embodiments.
Figure 4B:
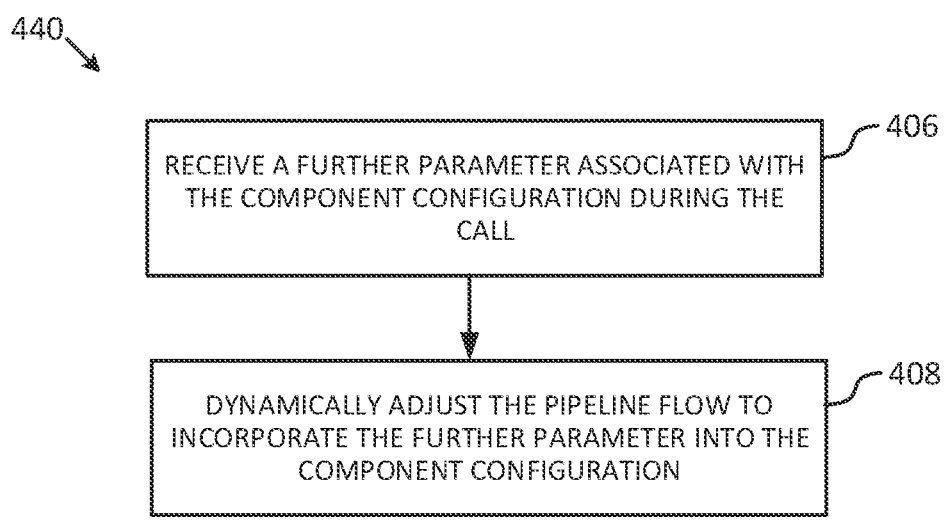

FIGS. 4A and 4B depict flowcharts illustrating example methods 420 and 440 for managing pipeline flows during operation, according to various example embodiments. It will be understood that example methods described herein may be performed by a machine in accordance with some embodiments. For example, methods 420 and 440 can be performed by the pipeline flow management system 110 described with respect to FIG. 1 and FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of methods 420 and 440 may be represented by executable instructions that, when executed by a processor of a computing device, cause the computing device to perform methods 420 and 440. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Method 420 includes operations 402 and 404.

At operation 402, the processor triggers one or more pipeline instances based on applying a pipeline flow to the call.

At operation 404, the processor causes one or more components to generate one or more outputs of the call based on one or more corresponding component configurations included in the pipeline flow.

Method 440 includes operations 406 and 408.

At operation 406, the processor receives a further parameter associated with a component configuration during the processing of a communication.

At operation 408, the processor dynamically adjusts the pipeline flow to incorporate the further parameter into the component configuration during the processing of the communication.

Though not illustrated, methods 420 and 440 can include an operation where a graphical user interface for managing pipeline flows can be displayed (or caused to be displayed) by the hardware processor. For instance, the operation can cause a client device (e.g., the client device 102 communicatively coupled to the pipeline flow management system 110) to display the graphical user interface for managing pipeline flows. This operation for displaying the graphical user interface can be separate from operations 402 through 408 or, alternatively, form part of one or more of operations 402 through 408. In example embodiments, the graphical user interface may be caused to be generated and presented (e.g., on client device 102). In example embodiments, the user interface may facilitate a selection of parameters corresponding to each available component. A user may choose one or more parameters to define each component configuration to generate or update a pipeline flow associated with the user account or a type of user accounts.

FIG. 5A depicts a block diagram 520 illustrating an example pipeline flow, according to various example embodiments. As illustrated in FIG. 5A, an example pipeline flow 502 includes a recording component configuration 504, a transcription component configuration 506, and a language operation component configuration 508. Each component configuration may be defined by one or more parameters and may correspond to a component, such as component 118 as illustrated in FIG. 1. In various embodiments, a recording component (not shown) generates recording outputs 510 based on recording component configuration 504. A transcription component (not shown) generates transcription outputs 512 (e.g., transcripts of a conversation associated with a call) based on transcription component configuration 506. A language operation component (not shown) generates language operation outputs 512 (e.g., annotations or tags of a recording associated with a call) based on language operation component configuration 508. In various embodiments, the triggering steps of pipeline instances (e.g., actions) based on the component configurations may be arranged based on a pre-determined logical order as described herein. For example, a transcription component can be triggered based on the availability of an output of a recording component. A language operation component can be triggered based on the availability of an output of a transcription component.

Figure 5B:
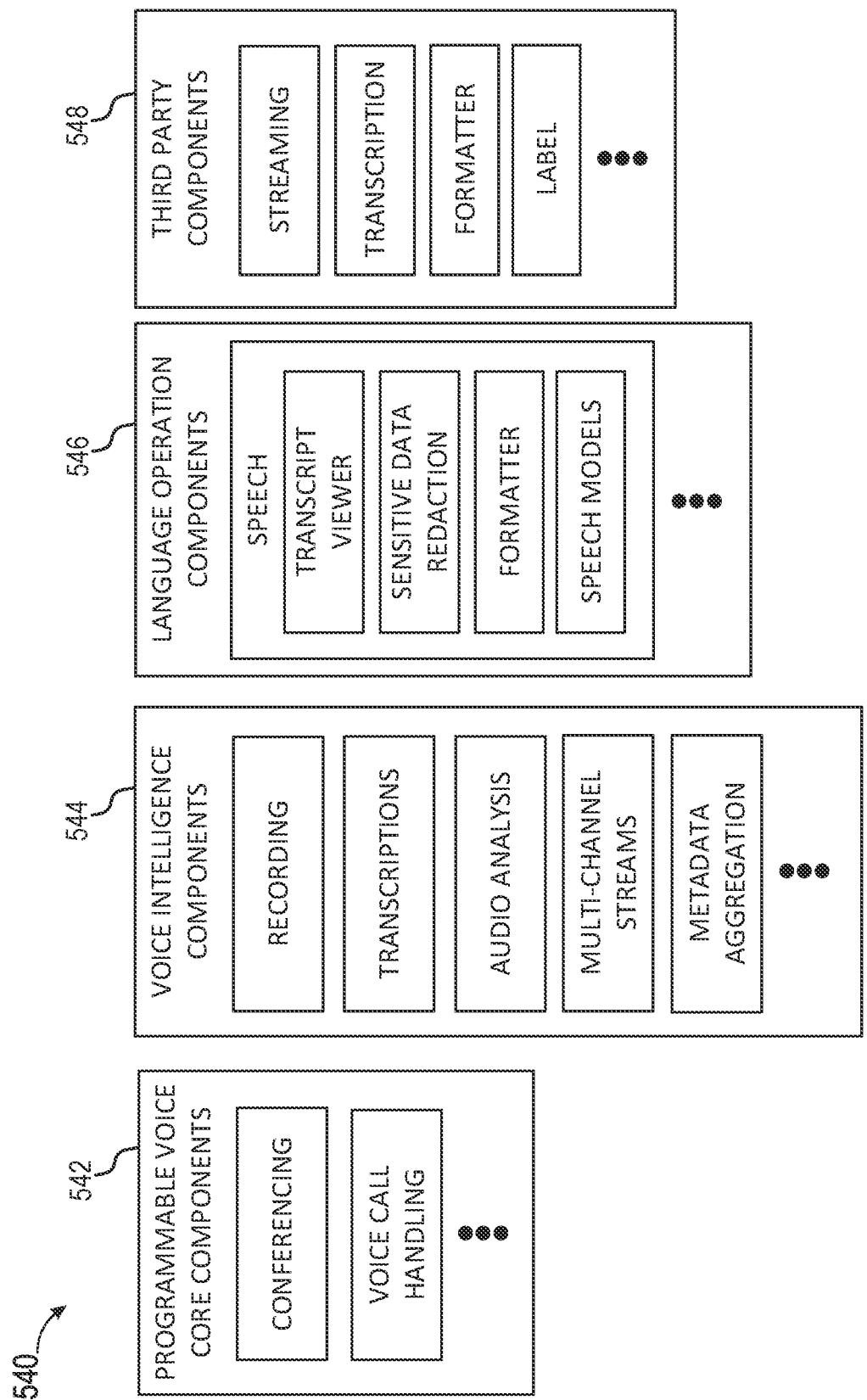
FIG. 5B depicts a block diagram illustrating an example component architecture, according to various example embodiments.

FIG. 5B depicts a block diagram 540 illustrating a component architecture, according to various example embodiments. As illustrated in FIG. 5B, each component configuration of the associated component may be incorporated into a pipeline flow for communication processing. Components may be internal components (e.g., components 542, 544, and 546) residing within the cloud-based communication platform 106, or external components (e.g., third party components 548) that are communicatively coupled to the cloud-based communication platform 106 via a communication network as described herein.

In various embodiments, programmable voice core components 542 at least include conferencing component and voice call handling component, as illustrated in FIG. 5B. The voice call handling component provides high-definition audio capabilities and Native codec negotiations (e.g., preserving audio quality). Programmable voice core components 542 provide custom ML-driven Text-To-Speech functionalities.

In various embodiments, voice intelligence components 544 at least include recording component, transcription component, audio analysis component, multi-channel streams component, and metadata aggregation component. The multi-channel streams component provides the ability to support a large number of channels of a communication and allows for multi-channel media streams using a Session Recording Protocol (e.g., SIPREC). The metadata aggregation component provides metadata capabilities. The transcription component supports real-time transcription and may also use an internal or an external language operation component as a transcriptions provider. The transcription component may also use multiple transcriptions providers from a Transcriptions Provider Marketplace (not shown). The audio analysis component provides analysis of crosstalk, silence detection, background noise, and audio normalization. In various embodiments, audio normalization is a process of balancing the volume of the selected audio clip. Specifically, the process of audio normalization includes analyzing the volume level of the selected clip and increasing the volume level of the clip with the lower volume to make it consistent with the clip with the highest volume level.

In various embodiments, the language operation components 546 at least include speech components that include transcript viewer component, sensitive data redaction component, formatter component, and speech models component, as illustrated in FIG. 5B. The language operation components 546 support transcription input from any transcription provider, operate on multi-stream recordings, support LIT operators and recordings filter operators, and provide Personal Identifiable Information (PII) redaction for recordings.

In various embodiments, the third-party components 548 at least include streaming component, transcription component, formatter component, and label component, as illustrated in FIG. 5B. In addition, the third-party components 548 also provide for one bill integration (e.g., customers do not have to receive invoices from a third-party service provider), OAuth installation and integration, marketing pages, metadata Serial Peripheral interface (SPI) interfaces that allow for API pass through, and SPI for real-time streaming and recordings.

Figure 6:
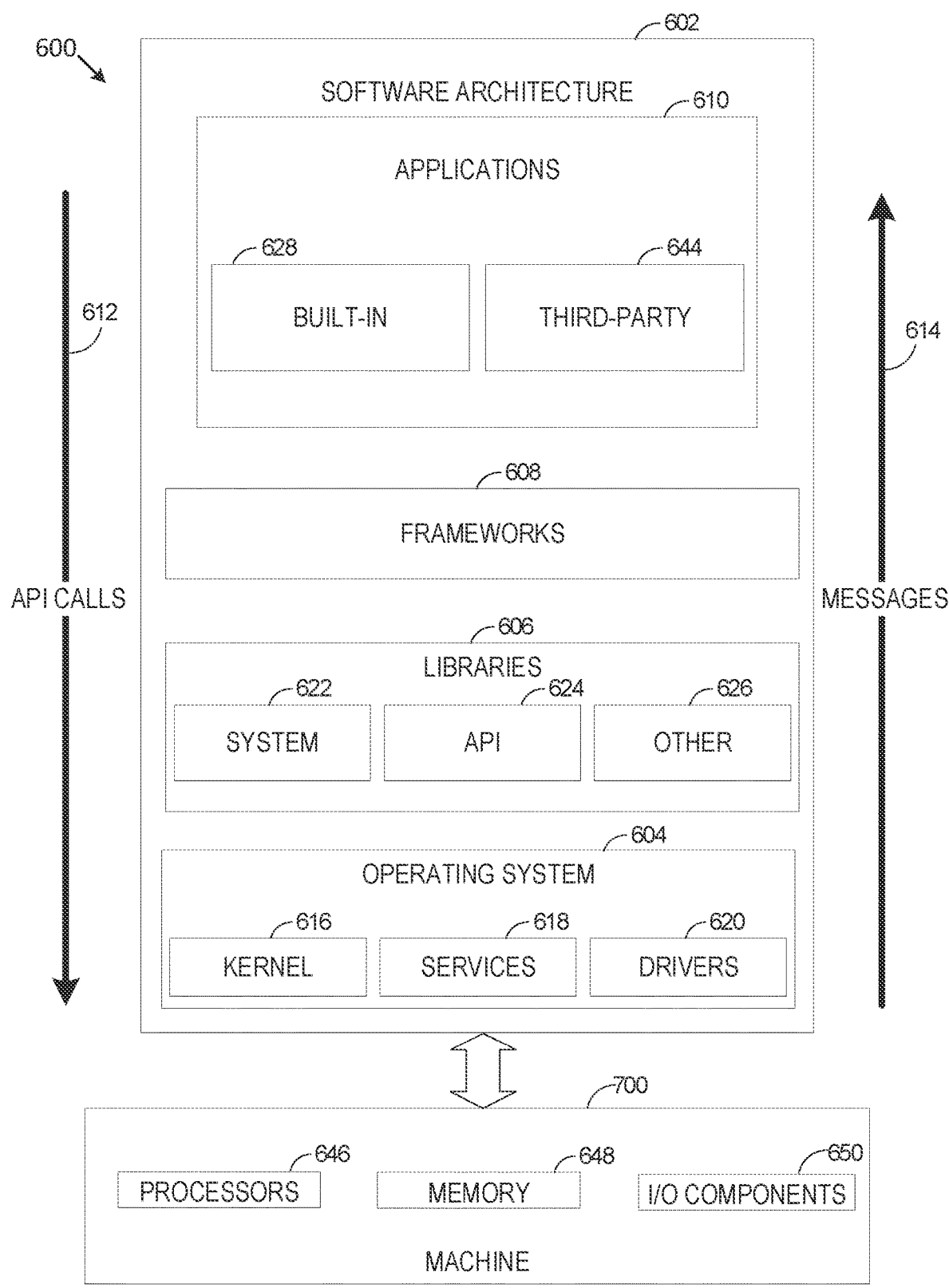
FIG. 6 depicts a block diagram illustrating an architecture of software, according to some embodiments.

FIG. 6 depicts a block diagram 600 illustrating an architecture of software 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as a machine 700 of FIG. 7 that includes processor(s) 646, memory 648, and I/O components 650. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke API calls 612 (application programming interface) through the software stack and receive messages 614 in response to the API calls 612, consistent with some embodiments.

In various implementations, the operating system 604 manages hardware resources and provides common services. The operating system 604 includes, for example, a kernel 616, services 618, and drivers 620. The kernel 616 acts as an abstraction layer between the hardware and the other software layers, consistent with some embodiments. For example, the kernel 616 provides memory management, processor management (e.g., scheduling), component management, networking, and security settings, among other functionalities. The services 618 can provide other common services for the other software layers. The drivers 620 are responsible for controlling or interfacing with the underlying hardware, according to some embodiments. For instance, the drivers 620 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 622 (e.g., C standard library) that can provide functions such as memory allocation functions, string manipulation functions, mathematic functions, and the like. In addition, the libraries 606 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 can also include a wide variety of other libraries 626 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system or platform.

In an embodiment, the applications 610 include built-in applications 628 and a broad assortment of other applications, such as a third-party application 644. The built-in applications 628 may include a home application, a contacts application, a browser application, a book reader application, a location application, a media application, a messaging application, a game application. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 644 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 644 can invoke the API calls 612 provided by the operating system 604 to facilitate functionality described herein.

Figure 7:
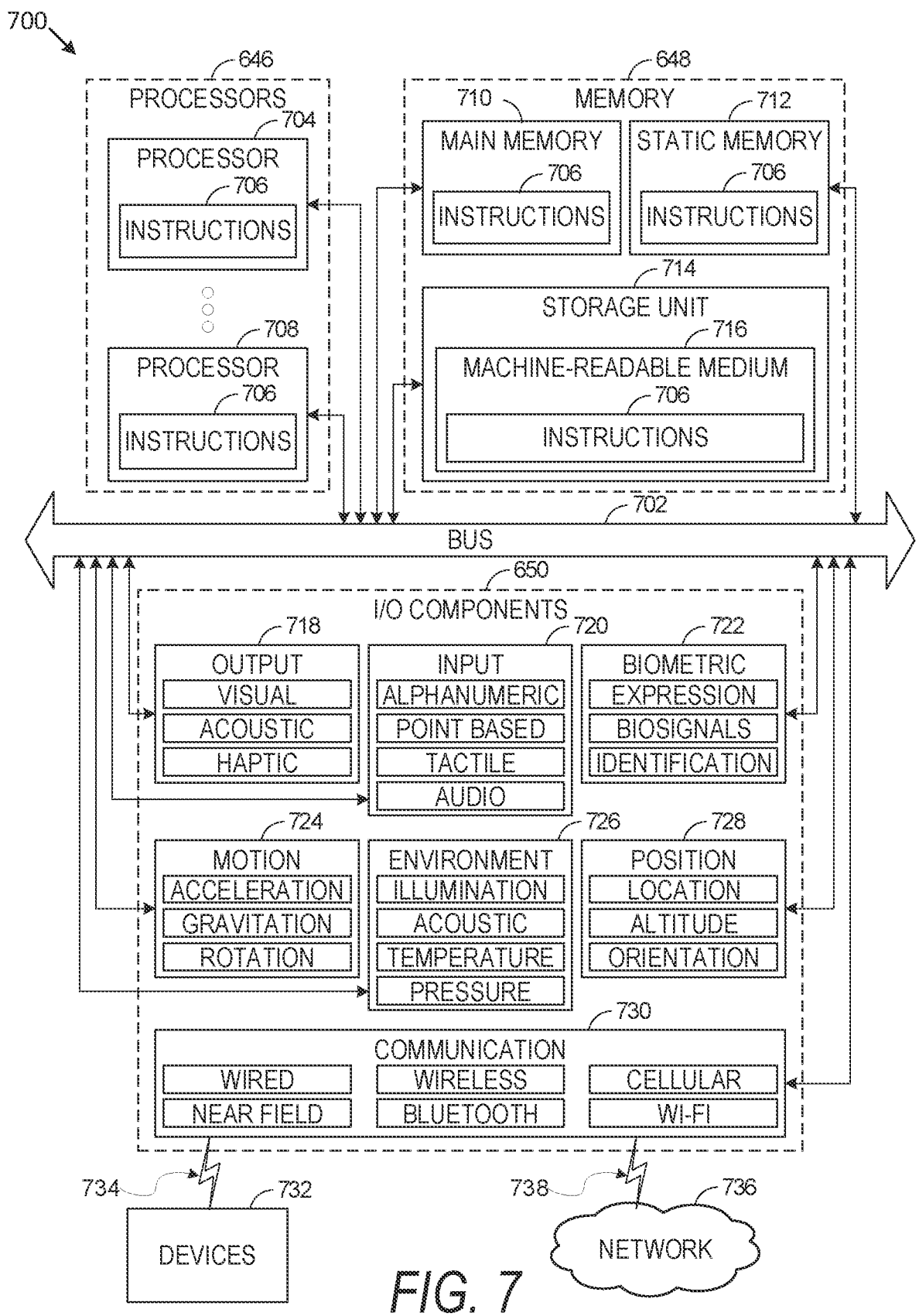
FIG. 7 illustrates a diagrammatic representation of a machine in the form of a computer system within which a set of instructions may be executed for causing a machine to perform any one or more of the methodologies discussed herein, according to some embodiments.

FIG. 7 illustrates a diagrammatic representation of a machine 700 in the form of a computer system within which a set of instructions may be executed for causing the machine to perform any one or more of the methodologies discussed herein, according to some embodiments. Specifically, FIG. 7 shows a diagrammatic representation of the machine 700 in the example form of a computer system, within which instructions 706 (e.g., software, a program, an application, an applet, an app, or other executable code) for causing the machine 700 to perform any one or more of the methodologies discussed herein may be executed. Additionally, or alternatively, the instructions 706 may implement the operations of method 300 and methods 420 and 440 shown in FIG. 3 and FIGS. 4A and 4B, or as elsewhere described herein.

The instructions 706 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 706, sequentially or otherwise, that specify actions to be taken by the machine 700. Further, while only a single machine 700 is illustrated, the term "machine" shall also be taken to include a collection of machines 700 that individually or jointly execute the instructions 706 to perform any one or more of the methodologies discussed herein.

The machine 700 may include processor(s) 646, memory 648, and I/O components 650, which may be configured to communicate with each other such as via a bus 702. In some embodiments, the processor(s) 646 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 704 and a processor 708 that may execute the instructions 706. The term "processor" is intended to include multi-core processors that may comprise two or more independent processors (sometimes referred to as "cores") that may execute instructions contemporaneously. Although FIG. 7 shows multiple processor(s) 646, the machine 700 may include a single processor with a single core, a single processor with multiple cores (e.g., a multi-core processor), multiple processors with a single core, multiple processors with multiples cores, or any combination thereof.

The memory 648 may include a main memory 710, a static memory 712, and a storage unit 714, each accessible to the processor(s) 646 such as via the bus 702. The main memory 710, the static memory 712, and storage unit 714 store the instructions 706 embodying any one or more of the methodologies or functions described herein. The instructions 706 may also reside, completely or partially, within the main memory 710, within the static memory 712, within the storage unit 714, within at least one of the processor(s) 646 (e.g., within the processor's cache memory), or any suitable combination thereof, during execution thereof by the machine 700.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 7. The I/O components 650 are grouped according to functionality merely for simplifying the following discussion and the grouping is in no way limiting. In some embodiments, the I/O components 650 may include output components 718 and input components 720. The output components 718 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 720 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 650 may include biometric components 722, motion components 724, environmental components 726, or position components 728, among a wide array of other components. For example, the biometric components 722 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 724 may include acceleration sensor components (e.g., accelerometer), gravitation sensor components, rotation sensor components (e.g., gyroscope), and so forth. The environmental components 726 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 728 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 730 operable to couple the machine 700 to a network 736 or devices 732 via a coupling 738 and a coupling 734, respectively. For example, the communication components 730 may include a network interface component or another suitable device to interface with the network 736. In further examples, the communication components 730 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 732 may be another machine or any of a wide variety of peripheral devices (e.g., a peripheral device coupled via a USB).

Moreover, the communication components 730 may detect identifiers or include components operable to detect identifiers. For example, the communication components 730 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 730, such as location via Internet Protocol (IP) geolocation, location via Wi-Fi® signal triangulation, location via detecting an NFC beacon signal that may indicate a particular location, and so forth.

The various memories (i.e., memory 648, main memory 710, and/or static memory 712) and/or storage unit 714 may store one or more sets of instructions and data structures (e.g., software) embodying or utilized by any one or more of the methodologies or functions described herein. These instructions (e.g., the instructions 706), when executed by processor(s) 646, cause various operations to implement the disclosed embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers, with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In some embodiments, one or more portions of the network 736 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 738 may be a Code Division Multiple Access (CDMA) connection, a Global System for Mobile communications (GSM) connection, or another type of cellular or wireless coupling. In this example, the coupling 738 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 706 may be transmitted or received over the network 736 using a transmission medium via a network interface device (e.g., a network interface component included in the communication components 730) and utilizing any one of a number of well-known transfer protocols (e.g., hypertext transfer protocol (HTTP)). Similarly, the instructions 706 may be transmitted or received using a transmission medium via the coupling 734 (e.g., a peer-to-peer coupling) to the devices 732. The terms "non-transitory computer-readable storage medium," "transmission medium" and "signal medium" mean the same thing and may be used interchangeably in this disclosure. The terms "transmission medium" and "signal medium" shall be taken to include any intangible medium that is capable of storing, encoding, or carrying the instructions 706 for execution by the machine 700, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "non-transitory computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to some embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Glossary

"CARRIER SIGNAL" in this context refers to any intangible medium that is capable of storing, encoding, or carrying instructions for execution by the machine 700, and includes digital or analog communications signals or other intangible medium to facilitate communication of such instructions 706. Instructions 706 may be transmitted or received over the network 736 using a transmission medium via a network interface device and using any one of a number of well-known transfer protocols.

"CLIENT DEVICE" in this context refers to any machine 700 that interfaces to a communications network 736 to obtain resources from one or more server systems or other client devices 102. A client device 102 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 632.

"COMMUNICATIONS NETWORK" in this context refers to one or more portions of a network 736 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 736 or a portion of a network 736 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 706 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 706. The term "machine-readable medium" shall also be taken to include any medium, or combination of multiple media, that is capable of storing instructions 706 (e.g., code) for execution by a machine 700, such that the instructions 706, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 646) may be configured by software (e.g., an application 610 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor 704 or other programmable processors.

Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 646, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 646 that are temporarily configured (e.g., by software) or permanently configured to perform the relevant operations. Whether temporarily or permanently configured, such processors 646 may constitute processor-implemented components that operate to perform one or more operations or functions described herein. As used herein, "processor-implemented component" refers to a hardware component implemented using one or more processors 646. Similarly, the methods described herein may be at least partially processor-implemented, with a particular processor or processors 646 being an example of hardware. For example, at least some of the operations of a method may be performed by one or more processors 646 or processor-implemented components. Moreover, the one or more processors 646 may also operate to support performance of the relevant operations in a "cloud computing" environment or as a "software as a service"

(SaaS). For example, at least some of the operations may be performed by a group of computers (as examples of machines 700 including processors 646), with these operations being accessible via a network 736 (e.g., the Internet) and via one or more appropriate interfaces (e.g., an API). The performance of certain of the operations may be distributed among the processors 646, not only residing within a single machine 700, but deployed across a number of machines 700. In some example embodiments, the processors 646 or processor-implemented components may be located in a single geographic location (e.g., within a home environment, an office environment, or a server farm). In other example embodiments, the processors 646 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 646 (sometimes referred to as "cores") that may execute instructions 706 contemporaneously.

What is claimed is:

1. A method comprising:
    receiving a first request, the first request to generate a customized pipeline flow, the first request including one or more parameters that define one or more component configurations in the customized pipeline flow;
    identifying a user account based on the first request, the user account being associated with a default pipeline flow, the default pipeline flow including a plurality of default parameters;
    generating the customized pipeline flow that includes the plurality of components, the generating of the customized pipeline flow including incorporating the one or more parameters included in the request into the plurality of default parameters, an output of one component automatically triggering an action handled by another component in the customized pipeline flow;
    associating the customized pipeline flow with the user account;
    receiving a second request, the second request to process an action on the user account; and
    processing the action, the processing including applying the customized pipeline flow to select a component that handles the action based on a respective component configuration.

2. The method of claim 1, the processing the action further comprises:
    applying the customized pipeline flow to process a next action associated with the user account, the next action being determined based on the customized pipeline flow.

3. The method of claim 1, further comprising:
    upon selecting the component, causing a component associated with the component configuration to generate an output of a call.

4. The method of claim 3, wherein the output of the call including one of: a recording of the call, a transcription of the call, and metadata associated with the call.

5. The method of claim 3, wherein the call is a voice call or a video call.

6. The method of claim 1, wherein the action is triggered via an Application Programming Interface (API) provided by the component associated with the component configuration.

7. The method of claim 1, wherein the component corresponds to an internal component or an external component.

8. The method of claim 1, further comprising:
    configuring the customized pipeline flow based on one or more rules, wherein a transcription component is triggered based on an availability of an output of a recording component, and wherein a language operation component is triggered based on an availability of an output of a transcription component.

9. The method of claim 1, comprising:
    upon identifying the user account based on the first request, determining that the default pipeline flow is associated with the user account.

10. The method of claim 9, further comprising:
    receiving a further parameter of a component configuration associated with the customized pipeline flow during processing of a communication; and
    dynamically adjusting the customized pipeline flow to incorporate the further parameter into the component configuration.

11. A system comprising:
    a memory storing instructions; and
    one or more hardware processors communicatively coupled to the memory and configured by the instructions to perform operations comprising:
    receiving a first request, the first request to generate a customized pipeline flow, the first request including one or more parameters that define one or more component configurations in the customized pipeline flow;
    identifying a user account based on the first request, the user account being associated with a default pipeline flow, the default pipeline flow including a plurality of default parameters;
    generating the customized pipeline flow that includes the plurality of components, the generating of the customized pipeline flow including incorporating the one or more parameters included in the request into the plurality of default parameters, an output of one component automatically triggering an action handled by another component in the customized pipeline flow;
    associating the customized pipeline flow with the user account;
    receiving a second request, the second request to process an action on the user account; and
    processing the action, the processing including applying the customized pipeline flow to select a component that handles the action based on a respective component configuration.

12. The system of claim 11, the processing the action further comprises:
    applying the customized pipeline flow to process a next action associated with the user account, the next action being determined based on the customized pipeline flow.

13. The system of claim 11, the operations further comprise:

upon selecting the component, causing a component associated with the component configuration to generate an output of a call.

14. The system of claim 13, wherein the output of the call including one of: a recording of the call, a transcription of the call, and metadata associated with the call.

15. The system of claim 13, wherein the call is a voice call or a video call.

16. The system of claim 11, wherein the action is triggered via an Application Programming Interface (API) provided by the component associated with the component configuration.

17. The system of claim 11, the operations further comprise:
configuring the customized pipeline flow based on one or more rules, wherein a transcription component is triggered based on an availability of an output of a recording component, and wherein a language operation component is triggered based on an availability of an output of a transcription component.

18. The system of claim 11, wherein the operations further comprise:
upon identifying the user account based on the first request, determining that the default pipeline flow is associated with the user account.

19. The system of claim 18, the operations further comprise:
receiving a further parameter of a component configuration associated with the customized pipeline flow during processing of a communication; and
dynamically adjusting the customized pipeline flow to incorporate the further parameter into the component configuration.

20. A non-transitory computer-readable storage medium comprising instructions that, when executed by a processing device, cause the processing device to perform operations comprising:
receiving a first request, the first request to generate a customized pipeline flow, the first request including one or more parameters that define one or more component configurations in the customized pipeline flow;
identifying a user account based on the first request, the user account being associated with a default pipeline flow, the default pipeline flow including a plurality of default parameters;
generating the customized pipeline flow that includes the plurality of components, the generating of the customized pipeline flow including incorporating the one or more parameters included in the request into the plurality of default parameters, an output of one component automatically triggering an action handled by another component in the customized pipeline flow;
associating the customized pipeline flow with the user account;
receiving a second request, the second request to process an action on the user account; and
processing the action, the processing including applying the customized pipeline flow to select a component that handles the action based on a respective component configuration.

* * * * *